(12) United States Patent
Kume et al.

(10) Patent No.: US 11,977,192 B2
(45) Date of Patent: May 7, 2024

(54) CHARGED-PARTICLE TRAJECTORY MEASUREMENT APPARATUS AND CHARGED-PARTICLE TRAJECTORY MEASUREMENT METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Naoto Kume, Yokohama (JP); Haruo Miyadera, Kawasaki (JP); Takuro Fujimaki, Ota (JP); Tsukasa Sugita, Yokohama (JP); Yuki Nakai, Yokohama (JP); Masataka Suga, Kawasaki (JP); Kohei Nobe, Ota (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 83 days.

(21) Appl. No.: 17/814,365

(22) Filed: Jul. 22, 2022

(65) Prior Publication Data
US 2023/0029942 A1 Feb. 2, 2023

(30) Foreign Application Priority Data
Aug. 2, 2021 (JP) .................... 2021-126394

(51) Int. Cl.
*G01T 1/29* (2006.01)
*G01T 1/172* (2006.01)
*G01T 1/18* (2006.01)

(52) U.S. Cl.
CPC ............ *G01T 1/2907* (2013.01); *G01T 1/172* (2013.01); *G01T 1/18* (2013.01)

(58) Field of Classification Search
CPC .......... G01T 1/2907; G01T 1/172; G01T 1/18
See application file for complete search history.

(56) References Cited

U.S. PATENT DOCUMENTS

2008/0315091 A1* 12/2008 Morris ...................... G01T 1/18
250/306
2015/0245802 A1* 9/2015 Sossong ............... A61B 6/4092
600/407

(Continued)

FOREIGN PATENT DOCUMENTS

JP 5479904 B2 4/2014
JP 2017-146269 A 8/2017

(Continued)

*Primary Examiner* — Hugh Maupin
(74) *Attorney, Agent, or Firm* — Oblon, McClelland, Maier & Neustadt, L.L.P.

(57) ABSTRACT

In one embodiment, a charged-particle trajectory measurement apparatus for measuring a trajectory of a cosmic ray muon as a charged particle includes: a plurality of detectors, each of which generates a detection signal at the time of detecting a cosmic ray muon; a signal processing circuit that processes the detection signal from the detector; a time calculator that calculates the generation time point of the detection signal from the detector on the basis of the signal outputted from the signal processing circuit; a trajectory calculator that calculates the trajectory of the cosmic ray muon on the basis of the generation time point of the detection signal and the positional information of the detector having detected the cosmic ray muon, wherein the signal processing circuit and each of the detectors are integrally configured by being coupled to each other.

6 Claims, 9 Drawing Sheets

(56) References Cited

U.S. PATENT DOCUMENTS

2015/0325013 A1* 11/2015 Patnaik .................... G06T 7/11
                                                         345/424
2016/0291197 A1* 10/2016 Sossong ................. G01T 3/008

FOREIGN PATENT DOCUMENTS

| JP | 6465867 B2 | 2/2019 |
| WO | WO 2008/118209 A2 | 10/2008 |
| WO | WO 2014/179238 A2 | 11/2014 |

\* cited by examiner

CHARGED-PARTICLE TRAJECTORY MEASUREMENT APPARATUS AND CHARGED-PARTICLE TRAJECTORY MEASUREMENT METHOD

CROSS-REFERENCE TO RELATED APPLICATION

This application is based upon and claims the benefit of priority from Japanese Patent Application No. 2021-126394, filed on Aug. 2, 2021, the entire contents of which are incorporated herein by reference.

FIELD

Embodiments of the present invention relate to a charged-particle trajectory measurement apparatus and a charged-particle trajectory measurement method for measuring a trajectory of charged particles such as cosmic ray muons.

BACKGROUND

A fluoroscopic technique using charged particles such as muons is known as a technique for imaging the inside of an object to be measured. Charged particles pass through a substance while scattering in the substance, and this property is different from radioactive rays which are the same as light and/or electromagnetic waves. Thus, it is known as its feature that density and average atomic number of a substance can be estimated from the direction of charged-particle arrival and the degree of its scattering.

For example, charged particles to be generated by cosmic rays are called cosmic ray muons. The cosmic ray muons have very high energy and high penetrating power and are used for imaging the inside of a large structure such as a volcano and a pyramid. In the case of such imaging, it is important to accurately acquire trajectory information of charged particles, and an apparatus using a plastic scintillator and/or a fiber scintillator and an apparatus using drift tube detectors are used for acquiring the trajectory information.

[Patent Document 1] JP 5479904 B2
[Patent Document 2] JP 6465867 B2

In the technique proposed in Patent Document 1, a plurality of layers of drift tube detectors are arranged in the horizontal direction and in the vertical direction and a muon trajectory is calculated to perform imaging. In the technique proposed in Patent Document 1, a plurality of detectors are required, and the detectors and a circuit for performing signal processing are also configured as large-scale apparatuses. In Patent Document 2, a large-scale system using an inspection station for a large-scale measurement target such as a ship is described, and an apparatus having a structure for moving detectors is proposed.

Each of Patent Documents 1 and 2 describe a measurement apparatus in which detectors are arranged on both sides of the measurement target. In particular, Patent Document 2 proposes a considerably large measurement area of 53 feet in length and 8 feet in width. In this case, it is necessary to prepare considerably large detectors to be incorporated in the apparatus, and thus, it is required to assemble the apparatus at the installation site. Although the positions of the respective detectors are required to be accurately grasped in order to measure the trajectory correctly, in the installation work, it is very difficult to grasp a detector position for each time of installing a detector.

Further, signals to be obtained from detectors for measuring charged particles are small in intensity. Hence, in general, measurement is performed by using a dedicated amplifier circuit. This amplifier circuit is susceptible to electromagnetic noise, and thus, it is necessary to finely manage the type of cable and wiring route depending on the installation site.

As described above, the techniques of Patent Documents 1 and 2 are apparatus configurations and signal processing methods for accurately performing muon tomography. In these configurations and methods, very fine adjustment such as reduction in installation error to be generated at the time of installing the apparatus and countermeasures against electromagnetic noise are required for high-precision measurement.

SUMMARY OF THE INVENTION

In view of the above-described circumstances, embodiments of the present invention aim to provide a charged-particle trajectory measurement apparatus and a charged-particle trajectory measurement method, each of which can measure the trajectory of charged particles with high accuracy while reducing noise, installation error, and installation space.

DETAILED DESCRIPTION

Hereinbelow, embodiments of the present invention will be described by referring to the accompanying drawings.

[A] First Embodiment (FIG. 1 to FIG. 8)

Figure 1:
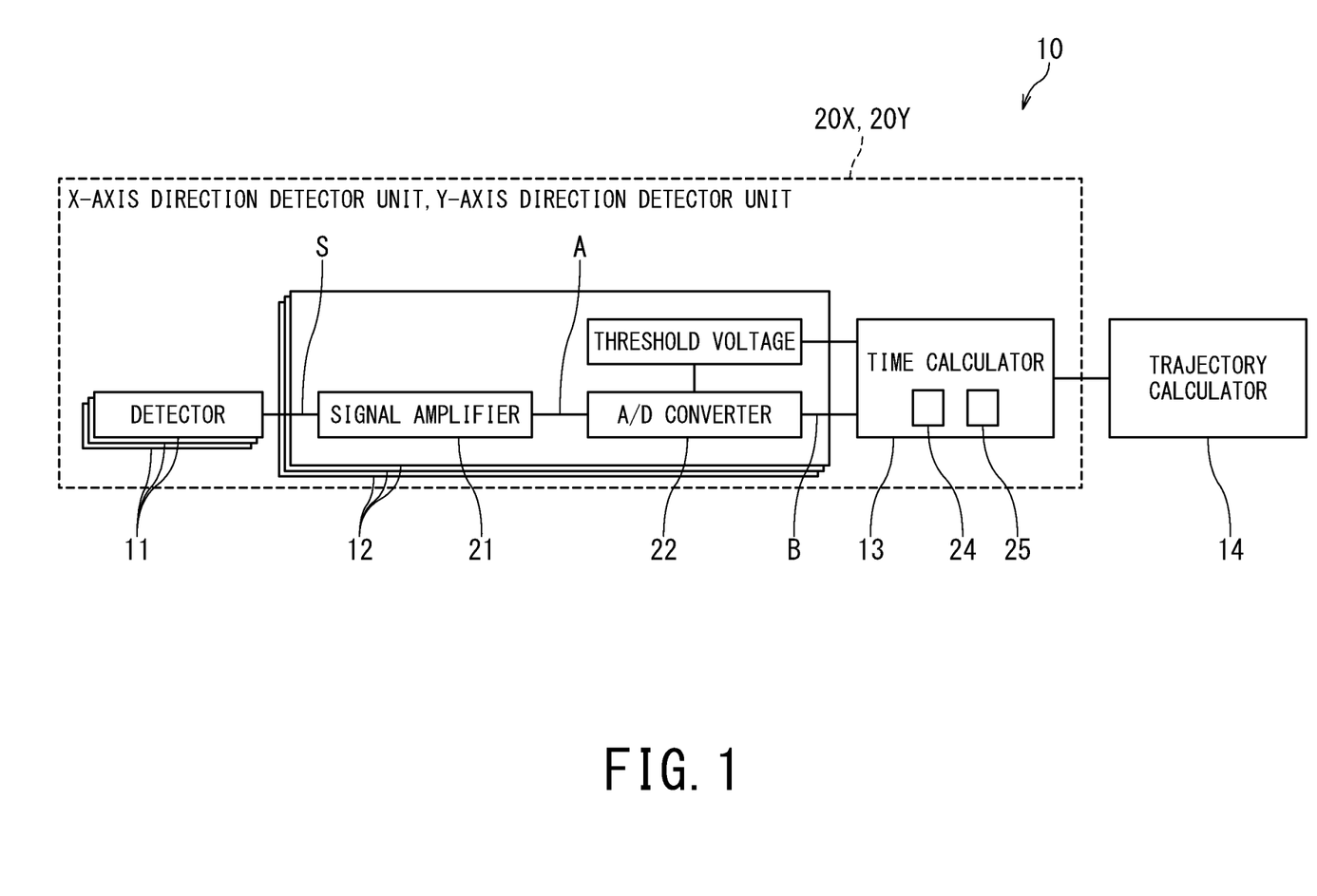
FIG. 1 is a block diagram illustrating a configuration of a charged-particle trajectory measurement apparatus according to the first embodiment.

FIG. 1 is a block diagram of a charged-particle trajectory measurement apparatus 10 according to the first embodiment. The charged-particle trajectory measurement apparatus 10 shown in FIG. 1 measures trajectories of charged particles (for example, muons, especially cosmic ray muons) in order to image the inside of a natural object such as a mountain and a large building, and includes: detectors 11; signal processing circuits 12; time calculators 13; and a trajectory calculator 14.

Although the charged-particle trajectory measurement apparatus 10 can be applied to muons generated by an accelerator and charged particles due to electrons, a description will be given of a case of particles called cosmic ray muons. Cosmic ray muons flying from space have extremely high energy and have very high penetrating power in a substance as compared with radioactive rays such as X-rays.

Fluoroscopic techniques utilizing these characteristics include, for example, a transmission method for evaluating density of a substance by permeability of cosmic ray muons in the substance and a scattering method for evaluating density of the substance on the basis of the degree of scattering of cosmic ray muons in the substance. Both methods can obtain information inside a very large building by using high penetrating power of cosmic ray muons. In order to obtain the internal information with high accuracy, it is required to measure a trajectory of a cosmic ray muon with high accuracy. However, a measurement target tends to be large in size due to characteristics of cosmic ray muons and there is a limit to the number of cosmic ray muons that can reach the surface of the earth. For these reasons, a detection unit as large as several meters or more is often used.

In such a situation, a large number of detectors are required, the plurality of detectors are arranged such that a trajectory of a cosmic ray muon is calculated from the positional information of the detector having detected the cosmic ray muon among all the detectors. In the case of specifying the passing position of the cosmic ray muon in the detector and acquiring the positional information of the detector having detected the cosmic ray muon, it is required to secure a large measurement area of the detectors and measure the passing position of the cosmic ray muon with high accuracy, which leads to a considerably large measurement apparatus in size.

Figure 4:
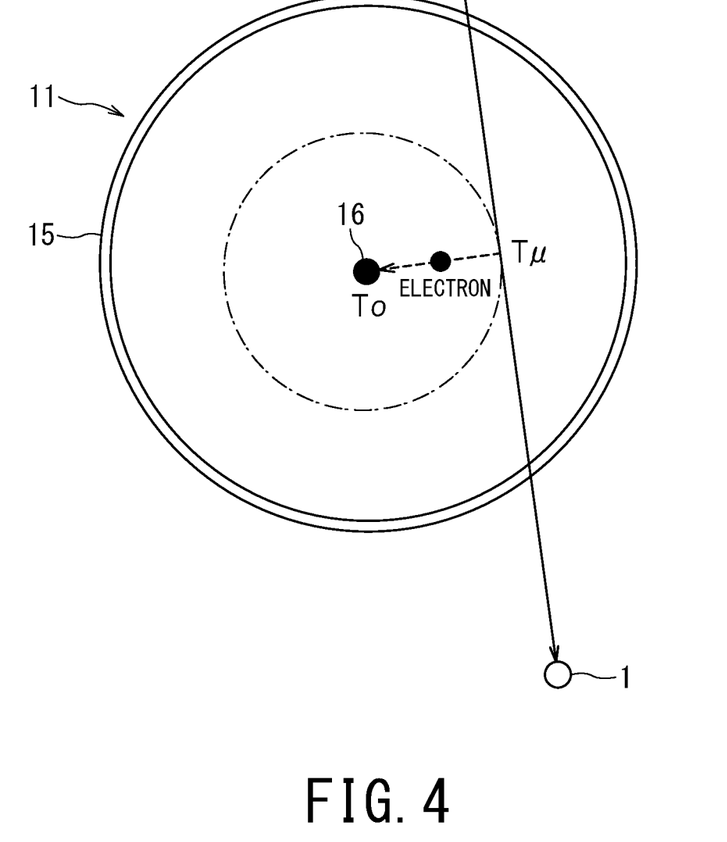
FIG. 4 is a schematic diagram illustrating the detection status of cosmic ray muons by the detectors in FIG. 1 to FIG. 3.

Each detector 11 of the present embodiment is a drift tube detector configured to detect the passing position of a cosmic ray muon inside the detector 11 itself on the basis of the drift time during which each electron generated by the passage of the cosmic ray muon in the detector 11 moves. In each detector 11 configures as a drift tube detector, as shown in FIG. 4, a core wire 16 to be supplied with high voltage is stretched at the center position in a cylindrical tube 15 configured as a tubular body, and ionization-purpose gas containing noble gas as the main component is sealed in the cylindrical tube 15. When the cosmic ray muon 1 passes through the drift tube detector, the ionization-purpose gas is ionized and separated into ions and electrons.

At the timing when the separated electrons move and reach the core wire 16, a detection signal S is outputted from the drift tube detector (i.e., detector 11), and the passage of the cosmic ray muon 1 in the drift tube detector is detected. On the basis of: the time point Tµ at which electrons are generated by ionization of the ionization-purpose gas; and the time point (i.e., generation time To of the detection signal S) at which the electrons reach the core wire 16, the travel time (i.e., drift time) is determined as time length from generation of the electrons to the arrival of the electrons at the core wire 16 due to movement. When the movement distance (or drift radius) of the electrons to the core wire 16 is obtained on the basis of the drift time, the passing position of the cosmic ray muon 1 inside the drift tube detector can be detected.

The above-described drift tube detector can obtain a resolution of 1 mm or less, which is much smaller than the size of the detector itself. For example, in the case of a drift tube detector in which the diameter of its cylindrical tube 15 is 50 mm, the passing position of the cosmic ray muon 1 can be detected with an accuracy of less than 0.5 mm.

As to the detectors 11, it is sufficient if each detector 11 can measure charged particles in particle units. A proportional counter, a multi-wire system, and a GEM detector can also be used as each detector 11, in addition to the drift tube detector. As to each detector 11, its detection method and its outer shape are not limited to a specific method or shape. In addition, a method that can specify positions in respective two directions orthogonal to each other by using one detector is also applicable to each detector 11.

Figure 2:
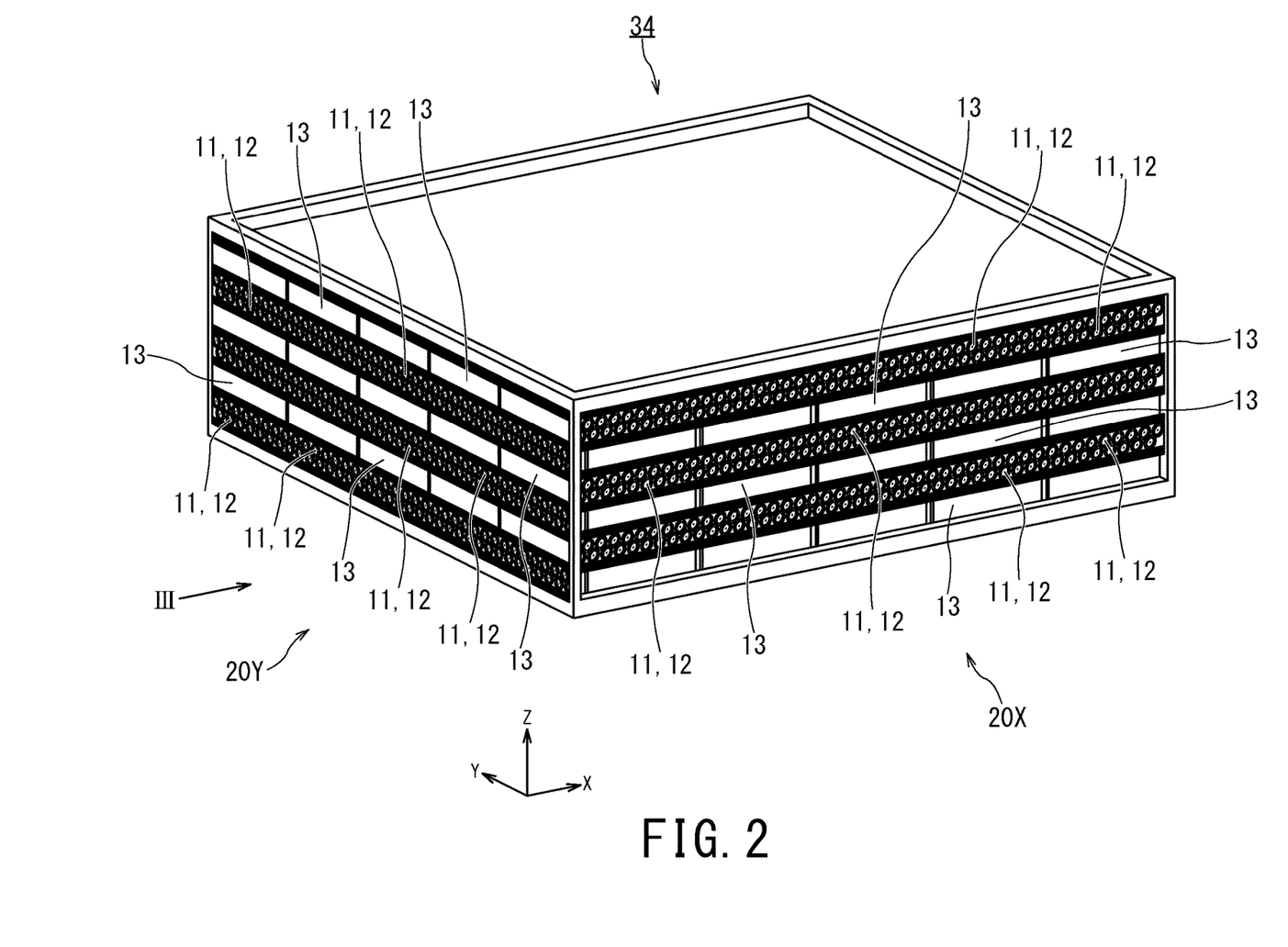
FIG. 2 is a perspective view illustrating a module structure in which time calculators, signal processing circuits, and detectors of the charged-particle trajectory measurement apparatus in FIG. 1 are supported by a frame.
Figure 3:
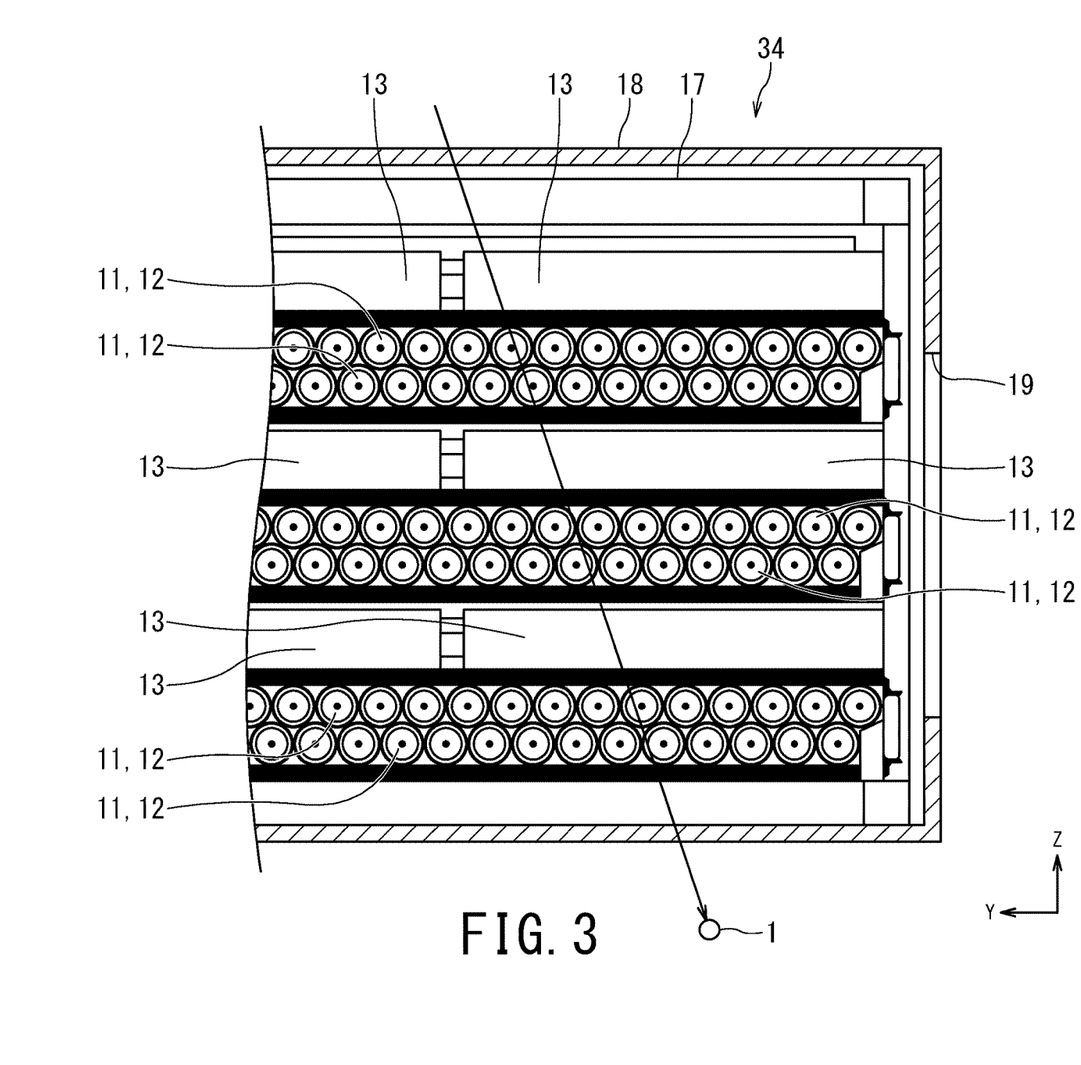
FIG. 3 is a view on an arrow III in FIG. 2.

Next, a description will be given of arrangement of the detectors 11 configured to detect the cosmic ray muons 1 and output detection signals S on the basis of the X-axis and Y-axis directions orthogonal to each other as shown in FIG. 2 and FIG. 3.

Among all the detectors 11, for example, a half of the detectors 11 are planarly arranged along the X-axis direction so as to constitute an X-axis direction detector unit 20X for detecting a position of a cosmic ray muon in the X-axis direction. The rest of the detectors 11 are planarly arranged along the Y-axis direction so as to constitute a Y-axis direction detector unit 20Y for detecting a position of a cosmic ray muon in the Y-axis direction.

Each of the X-axis direction detector unit 20X and the Y-axis direction detector unit 20Y is composed of a total of at least four layers of the detectors 11, for example, six layers in the case of FIG. 2. In detail, two layers of the detectors 11 as a part of the X-axis direction detector unit 20X and two layers of the detectors 11 as a part of the Y-axis direction detector unit 20Y are alternately stacked. Note that the arrangement of the detectors 11 is not limited to the aspect of FIG. 2.

The X-axis direction detector unit 20X includes: the above-described six layers of detectors 11; a plurality of signal processing circuits 12 connected to the respective detectors 11; and a plurality of time calculators 13 connected to the respective signal processing circuits 12. Similarly, the Y-axis direction detector unit 20Y includes: the above-described six layers of detectors 11; a plurality of signal processing circuits 12 connected to the respective detectors 11; and a plurality of time calculators 13 connected to the respective signal processing circuits 12.

The detectors 11, the signal processing circuits 12, and the time calculators 13 constituting the above-described X-axis and Y-axis direction detector units 20X and 20Y are supported by a frame 17 so as to form a module structure 34. In this module structure 34, the periphery of the frame 17 is covered with a cover 18. In the cover 18, a heat radiating window 19 is formed as a heat radiating means for radiating heat generated in the cover 18. The detectors 11, the signal processing circuits 12, and the time calculators 13 of the above-described module structure 34 detect the cosmic ray muons 1 that are made incident from approximately the Z-axis direction orthogonal to the X-axis direction and the Y-axis direction.

The frame 17 is for fixing and supporting the detectors 11, the signal processing circuits 12, and the time calculators 13, and is not limited to a specific material or a specific shape. The frame 17 is required to have predetermined characteristics such as sufficient degree of rigidity for ensuring installation accuracy of the detectors 11 even under the influence of bending due to load and/or deformation due to temperature change.

Each of the signal processing circuits 12 shown in FIG. 1 is integrally coupled and connected to one detector 11 as described below, is a circuit for processing the detection signal S from the integrally connected detector 11, and includes a signal amplifier 21 and an A/D convertor 22.

The signal amplifier 21 amplifies the detection signal S from the detector 11 to a measurable level, and an operational amplifier is applied, for example. The signal amplified by this signal amplifier 21 is shown as an output signal A in the lower part of FIG. 5.

Figure 5:
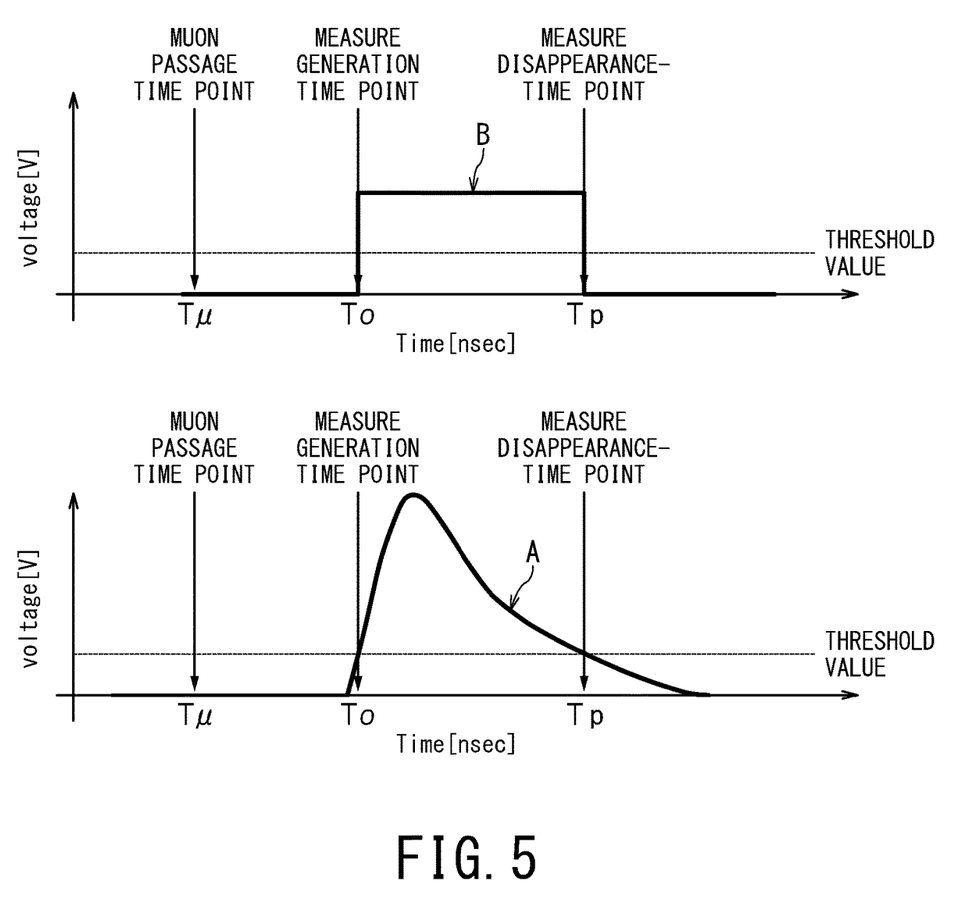
FIG. 5 is a graph illustrating functions of a disappearance time measurement unit and a generation time measurement unit of each time calculator in FIG. 1 to FIG. 3.

The A/D convertor 22 shown in FIG. 1 performs A/D conversion on the output signal A outputted from the signal amplifier 21 into a digital signal B as shown in FIG. 5. A structure using an IC called a comparator is applied to the A/D convertor 22. The comparator generates a pulsed signal having a predetermined voltage when a signal equal to or higher than a preset threshold value is detected, and is the simplest A/D conversion element. That is, when the voltage of the output signal A from the signal amplifier 21 exceeds a predetermined threshold value, the A/D convertor 22 generates a pulsed digital signal B. Further, when the voltage of the output signal A from the signal amplifier 21 decreases to or below the above-described threshold value, the A/D convertor 22 eliminates the pulsed digital signal B.

Figure 6:
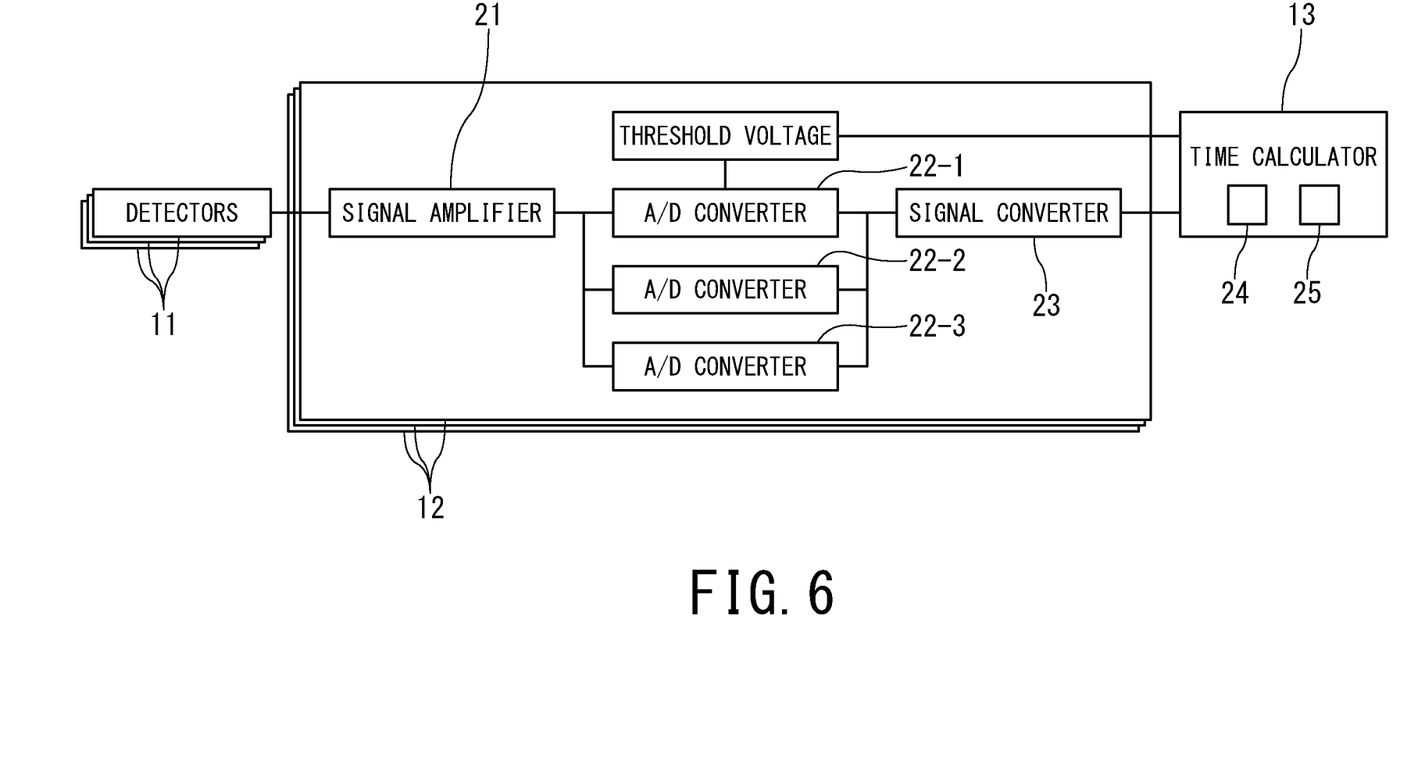
FIG. 6 is a block diagram illustrating a modification of the charged-particle trajectory measurement apparatus in FIG. 1.

In the case of the above-described comparator method, the difference between the time point when the detection signal S is actually generated by the detector 11 and the time point when the detection signal S exceeds the threshold voltage may differ depending on, for example, the pulsed waveform. This difference is called a time walk, and FIG. 6 show a countermeasure against the time walk. The generation time point can be calculated by using a group of comparators (i.e., A/D convertors 22-1, 22-2, 22-3, and a signal converter 23) having a plurality of threshold voltages, and the time point at which the voltage is zero can be calculated from the correlation between the threshold voltage and the generation time point. Although it is not shown, a constant fraction type circuit which is common for correction of the time walk, a zero-cross type comparator, or a method of acquiring the waveform with a high-speed digitizer can be applied to the countermeasure against the time walk.

As to the functions of the signal amplifier 21 and the A/D convertor 22 of each signal processing circuit 12, it is sufficient if both (21, 22) can amplify the detection signal S generated by the detector 11 and perform A/D conversion on it such that the amplified and converted detection signal S can be detected as the digital signal B. Thus, in the signal amplifier 21 and the A/D convertor 22 of the signal processing circuit 12, the signal amplification function and the A/D conversion function may be integrated in one electronic circuit such as an ASIC.

The time calculator 13 shown in FIG. 1 includes: a generation time measurement unit (i.e., generation-time measurement processor) 24; and a disappearance time measurement unit (i.e., disappearance-time measurement processor) 25. As shown in FIG. 5, on the basis of the signal outputted from the signal processing circuit 12 (i.e., digital signal B obtained by the A/D convertor 22 of the signal processing circuit 12), the generation time measurement unit 24 measures the generation time point To of the detection signal S from the detector 11, and the disappearance time measuring means 25 measures the disappearance time point Tp of the detection signal S from the detector 11.

As to the time calculator 13, it is sufficient if the time calculator 13 can detect the generation time point and the disappearance time point of the signal in the detector 11 by treating a certain reference timing as the start time point, and this detection method is not limited to a specific method. For example, a CPLD, and an FPGA having a function of counting the elapsed time from the start of measurement can be use as the time calculator 13. In addition, the generation time measurement unit 24 and the disappearance time measurement unit 25 measure generation and disappearance of a signal with reference to a certain standard using the peak value and change amount of the signal. As long as the generation time measurement unit 24 and the disappearance time measurement unit 25 can perform the signal detection and time-point measurement, the signal detection method and the time-point measurement method are not limited to specific methods.

The trajectory calculator 14 shown in FIG. 1 calculates the trajectory of the cosmic ray muon 1 on the basis of the generation time point To of the detection signal S calculated by the time calculator 13 and the positional information of the detector 11 that has detected the cosmic ray muon 1.

In other words, the generation time point To of the detection signal S measured by the generation time measurement unit 24 is a time point based on the drift time that is determined by the characteristics of the drift tube detector (detector 11). This drift time is the time length that correlates with the distance from the core wire 16 of the drift tube detector (detector 11) to the passing position of the cosmic ray muon 1. Thus, when the time information (i.e., generation time point To of the detection signal S) measured by the generation time measurement unit 24, the function that converts the drift time into the travelling distance, and the position of the core wire 16 of the drift tube detector (detector 11) are determined, the trajectory calculator 14 can calculate the passing position at which the cosmic ray muon 1 has passed through the drift tube detector (detector 11).

In this manner, the trajectory calculator 14 can calculate the common tangent of the passing position of the cosmic ray muon 1 obtained by the plurality of drift tube detectors (detectors 11) that have detected the same cosmic ray muon 1 so as to calculate the trajectory of the cosmic ray muon 1. In this method, the trajectory of the cosmic ray muon 1 can be calculated even if the time point at which the cosmic ray muon 1 passes through the detector 11 cannot be precisely specified. In addition, when the passage time point of the cosmic ray muon 1 passing through the detector 11 is measured by another detector, this information can be used to evaluate the passing position of the cosmic ray muon 1 in the detector 11.

The trajectory calculator 14 calculates the trajectory of the cosmic ray muon 1 on the basis of the positional information on the installation position of the detector 11 and the generation time point To at which the detector 11 generates the detection signal S, and any device capable of this numerical calculation can be applied as the trajectory calculator 14. Evaluation by any one of the least squares method and machine learning can be used as the above-described trajectory calculation method.

Each detector 11 called a drift tube detector generally amplifies electrons by applying high voltage such as several kV, and further amplifies the generated electrons by using the signal amplifier 21 so as to measure charged particles. At this time, the detector 11 and the signal processing circuit 12 are generally used in the state of being connected to each other by using a coaxial cable and/or a coaxial connector that are resistant to high voltage. For example, in a commercially available proportional counter, the connector is an MHV connector or a pin type. When these are applied, these are connected to an external amplifier via a coaxial cable.

In the case of using a coaxial connector and a coaxial cable, the ones having a sufficient withstand voltage with respect to the operating voltage of the detector 11 are adopted. Since these coaxial cable and coaxial connector have electromagnetic shields, noise countermeasures against electromagnetic radiation from the outside are sufficient. However, the coaxial cable has electrostatic capacity of several tens of pF/m, and this electrostatic capacity becomes a load on the amplifier, and thereby noise increases.

In the case of using a non-coaxial cable, the non-coaxial cable is small in electrostatic capacity but has no electromagnetic shield, and thus, it becomes susceptible to electromagnetic noise from the outside.

In either case, the detector 11 and the signal amplifier 21 of the signal processing circuit 12 are connected by using a cable, but the cable itself causes a factor that deteriorates the measurement accuracy. For example, in the case of using a long cable, there is a possibility that a slight noise signal generated by the vibration of the long cable is generated. Conversely, in the case of using a short cable, it is necessary to mount connectors suitable for use under high voltage on both of the detector 11 and the signal processing circuit 12. In this case, considering the wiring work, the required space becomes large, and it becomes difficult to densely arrange the detectors 11.

Figure 7:
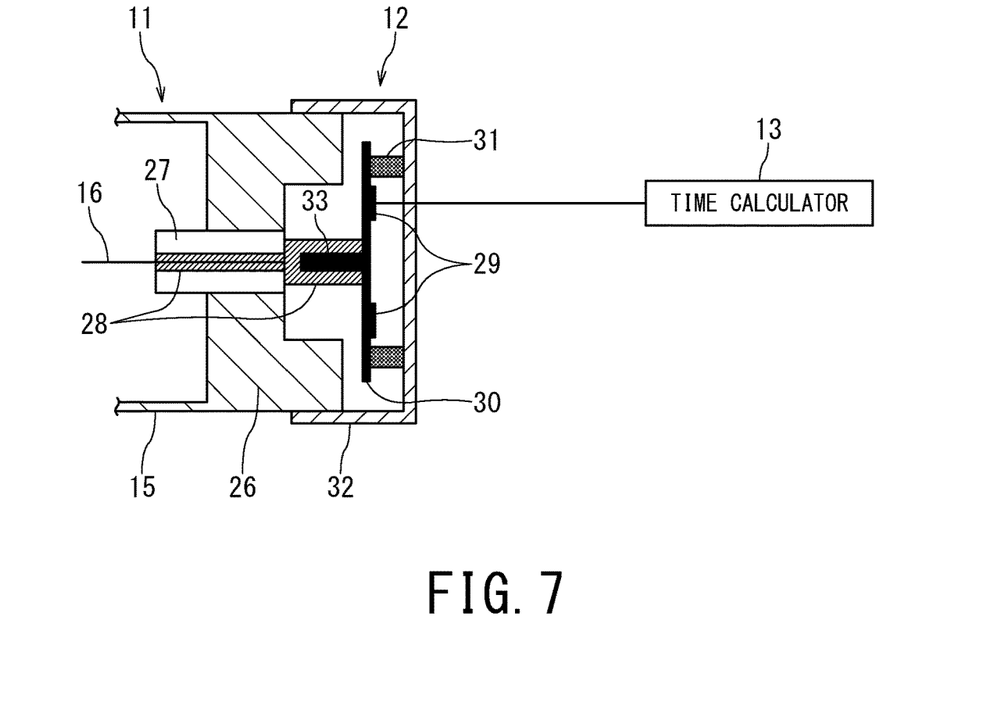
FIG. 7 is a cross-sectional view illustrating a coupling state between one signal processing circuit and one detector in FIG. 1.
Figure 8:
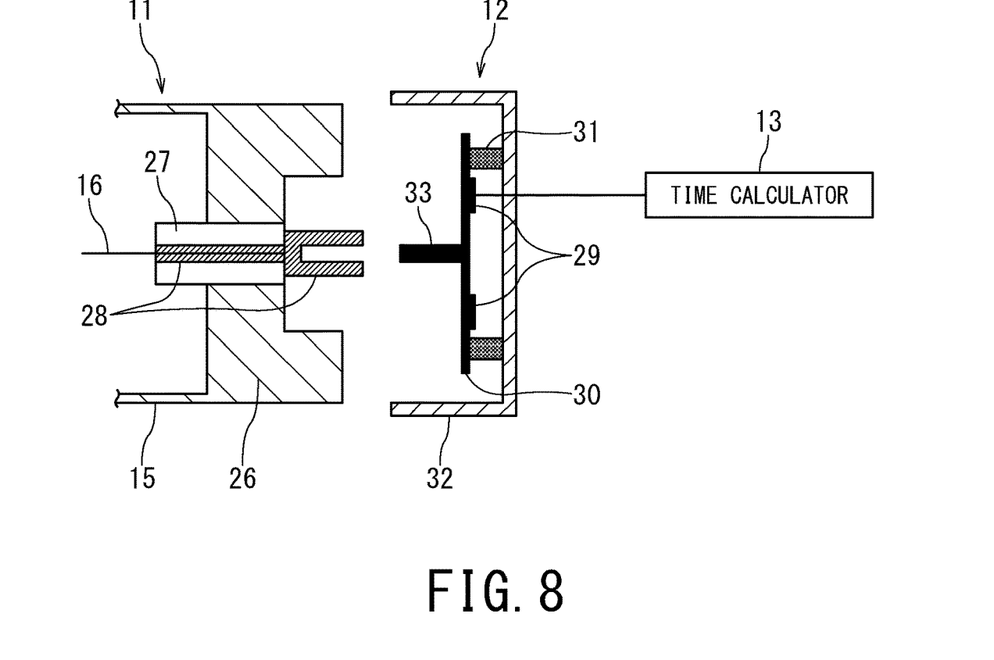
FIG. 8 is an exploded cross-sectional view illustrating the state of the detector and the signal processing circuit in FIG. 7 before coupling.

For the above-described reasons, in the present embodiment, each detector 11 is integrally coupled to the corresponding signal processing circuit 12 without interposing a cable. In other words, in each drift tube detector (detector 11) as shown in FIG. 4, FIG. 7, and FIG. 8, the ionization-purpose gas is sealed in the cylindrical tube 15 and the core wire 16 is stretched at the center position. The core wire 16 is held by a connector 28 that is installed on a ground (0 Volt) 26 of the cylindrical tube 15 via an insulator 27.

Each signal processing circuit 12 is housed under the state where a substrate 30 including circuit components 29 constituting the signal amplifier 21 and the A/D convertor 22 is held in a casing 32 by using a spacer 31. The back surface side of the substrate 30 is provided with a pin 33 that protrudes from the substrate 30 and has high rigidity without readily generating vibration. The pin 33 on the side of the signal processing circuit 12 is interdigitated with and coupled to the connector 28 on the side of the detector 11, the casing 32 on the side of the signal processing circuit 12 is interdigitated with and coupled to the ground 26 of the cylindrical tube 15 on the side of the detector 11, and thereby, the detector 11 and the signal processing circuit 12 are integrally formed by being coupled to each other.

Since the charged-particle trajectory measurement apparatus 10 according to the first embodiment is configured as described above, the following effects (1) to (3) are obtained.

(1) As shown in FIG. 7 and FIG. 8, no cable is interposed between each detector 11 configured to generate the detection signal S at the time of detecting the cosmic ray muon 1 and the corresponding signal processing circuit 12 configured to process the detection signal S from this detector 11, and both are integrally formed by being connected to each other. Thus, noise attributable to electrostatic capacity of the cable and/or electromagnetic noise from the outside can be reduced, installation error of each detector 11 and each signal processing circuit 12 can be reduced, and installation space of them can also be reduced. As a result, the trajectory of the cosmic ray muon 1 can be measured with high accuracy.

(2) As shown in FIG. 2 and FIG. 3, the detectors 11, the signal processing circuits 12, and the time calculators 13 are supported by the frame 17 having a sufficiently high rigidity for suppressing each of bending due to a load and distortion due to temperature change below an acceptable level, so that the main portions of the charged-particle trajectory measurement apparatus 10 are configured as the module structure 34. In the case of increasing the size of the charged-particle trajectory measurement apparatus 10, the measurement area of the cosmic ray muons 1 can be increased by arranging a plurality of the above-described module structures 34. Thus, the gap between the respective detectors 11 can be minimized and the positional accuracy of the detectors 11 can be ensured in the module structure 34. Hence, even in the case of increasing the measurement area of the cosmic ray muons 1, the installation accuracy of the cosmic ray muons 1 can be satisfactorily ensured.

(3) In the above-described module structure 34, the frame 17 supporting the detectors 11, the signal processing circuits 12, and the time calculators 13 is surrounded by the cover 18 having the heat dissipation window 19. Thus, effects of wind, rain, and heat can be suppressed even when the module structure 34 is transported or measured outdoors for a long time.

Figure 9:
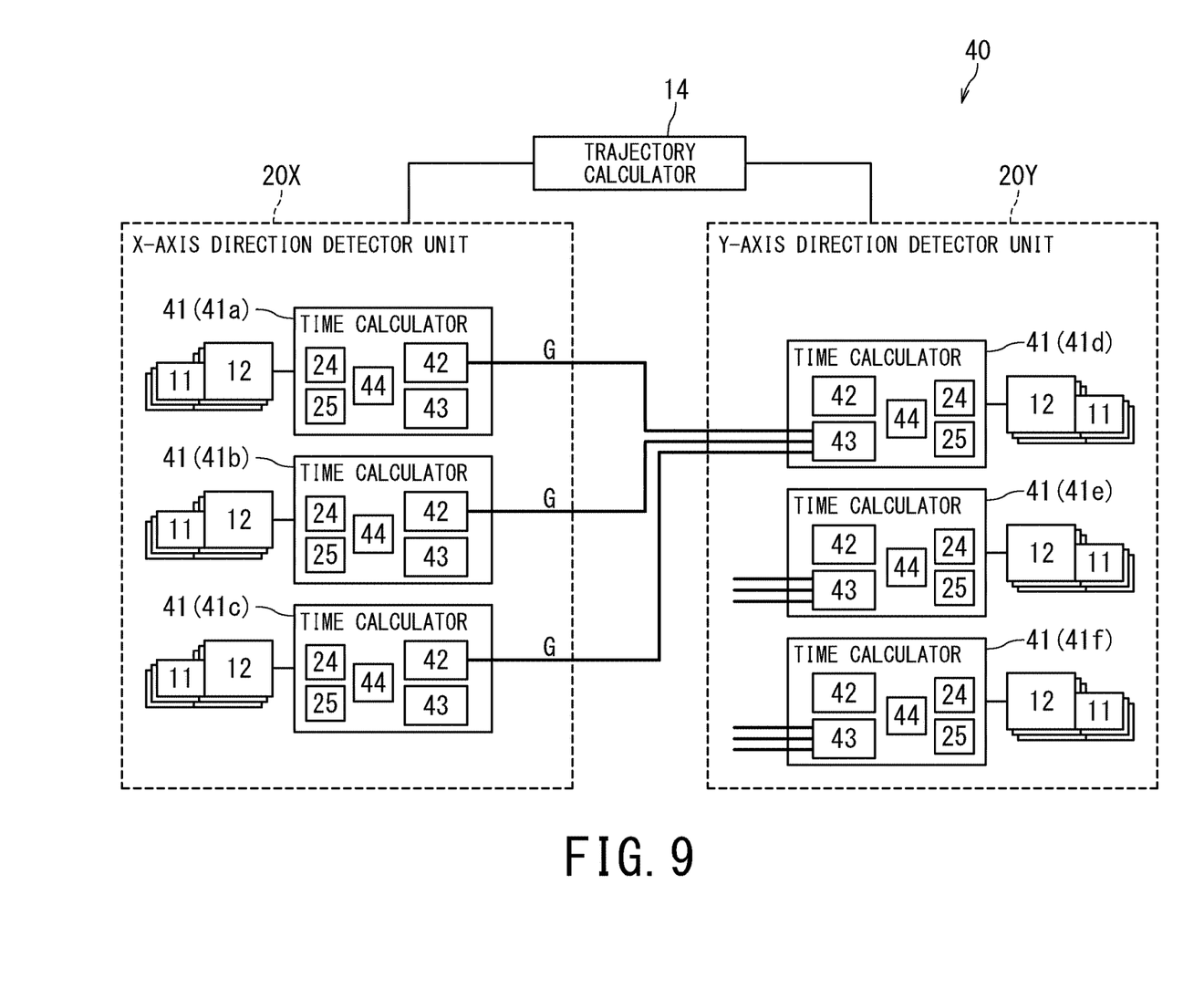
FIG. 9 is a block diagram illustrating a configuration of a charged-particle trajectory measurement apparatus according to the second embodiment.
Figure 10:
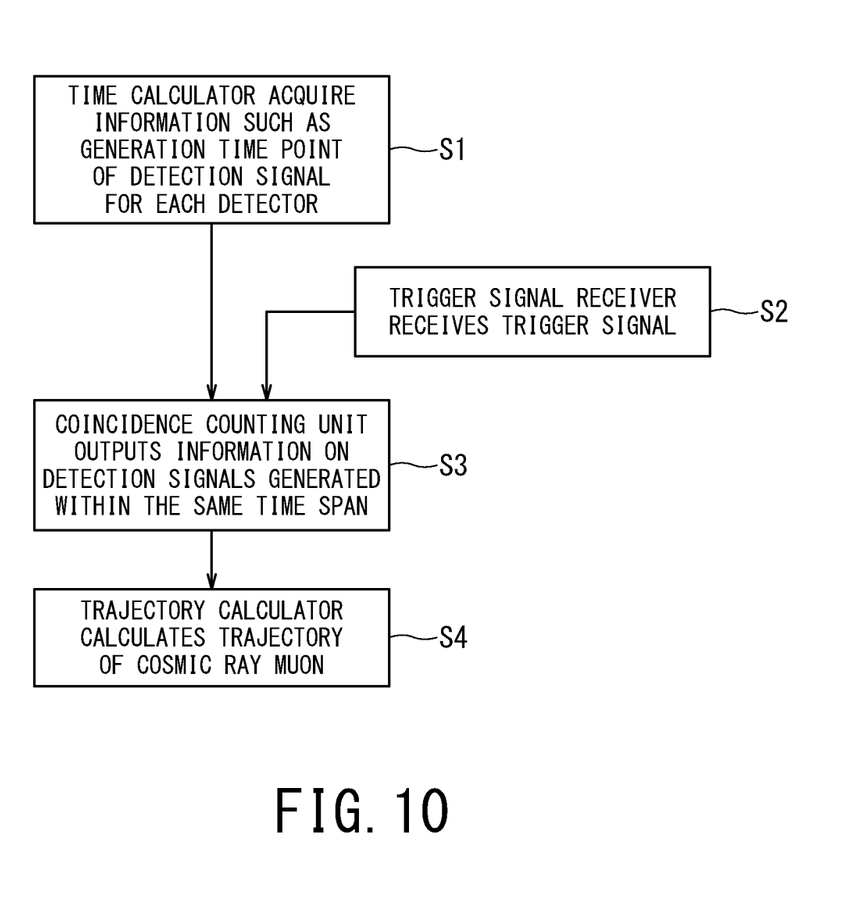
FIG. 10 is a flowchart of processing of calculating a cosmic ray muon trajectory to be performed by the charged-particle trajectory measurement apparatus in FIG. 9.

[B] Second Embodiment (FIG. 9 and FIG. 10)

FIG. 9 is a block diagram illustrating the configuration of a charged-particle trajectory measurement apparatus 40 according to the second embodiment. In the second embodiment, the same components as those in the first embodiment are denoted by the same reference signs as those in the first embodiment to simplify the description or omit the duplicate description. In order to discriminate a plurality of time calculators 41, subscripts "a" to "f" may be added as the final character of the reference sign like "41a".

In the charged-particle trajectory measurement apparatus 40 according to the second embodiment, each of the time calculators 41 includes: the generation time measurement unit 24; the disappearance time measurement unit 25; a trigger signal generator 42; a trigger signal receiver 43; and a coincidence counting unit (i.e., coincidence counting processor) 44. The trigger signal generator 42 generates a trigger signal G for notifying the generation of the detection signal S from the detector 11 on the basis of the output of the digital signal B from the signal processing circuit 12. Further, the trigger signal receiver 43 receives the trigger signal G from the outside.

The coincidence counting unit 44 outputs, to the trajectory calculator 14, information on a plurality of detection signals S that can be regarded as having occurred within the same time span based on the trigger signal G from the trigger signal generator 42 (for example, within the same short period during which the trigger signal G is being outputted). In other words, the coincidence counting unit 44 outputs both of the positional information of the detector(s) 11 having detected the cosmic ray muon 1 and information on the generation time point To of the detection signal S to the trajectory calculator 14. The coincidence counting unit 44 eliminates information on any event having occurred outside the above-described same time span. The trajectory calculator 14 calculates the trajectory of the cosmic ray muon 1 on the basis of the above-described information on the plurality of detection signals S that can be regarded as having occurred within the same time span based on the trigger signal G.

In detail, the cosmic ray muon 1 is characterized by having high penetrating power and causing interaction within the substance through which the cosmic ray muon 1 has passed. Although gamma rays have high penetrating power, it is determined by probability whether or not the gamma rays interact with the substance through which the gamma rays have passed. Thus, when a signal is generated by a plurality of detectors 11, the measurement system including the detectors 11 can correctly determine whether it is a detection signal by the cosmic ray muon 1 or other noise such as natural radiation.

For this reason, the time calculator 41 of the second embodiment outputs information on only the detection signal(s) S that can be regarded as having occurred within the same time span (for example, 1 second) in another time calculator 41 among the detection signals S detected by the plurality of detectors 11 (i.e., positional information of the detectors 11 and information on the generation time point To of the detection signals S) to the trajectory calculator 14.

For example, as shown in FIG. 9, the trigger signal generator 42 of the time calculator 41*a* belonging to the X-axis direction detector unit 20X generates the trigger signal G in response to the detection signal S, and this trigger signal G is received by the trigger signal receivers 43 of the respective time calculators 41*d*, 41*e* and 41*f* of the Y-axis direction detector unit 20Y. In this case, when the detection signal S is outputted from any one of the plurality of detectors 11 belonging to the time calculator 41*a* of the X-axis direction detector unit 20X, the trigger signal generator 42 of the time calculator 41*a* generates the trigger signal G and this trigger signal G is received by the time calculators 41*d*, 41*e*, and 41*f* of the Y-axis direction detector unit 20Y, which enables correct determination as to whether the detection signal S is outputted in the X-axis direction detector unit 20X in response to detecting the cosmic ray muon 1 or not.

Similarly, the trigger signals G from the trigger signal generators 42 of the other time calculators 41*b* and 41*c* in the X-axis direction detector unit 20X are inputted to the respective trigger signal receivers 43 of the plurality of time calculators 41*d*, 41*e*, and 41*f* in the Y-axis direction detector unit 20Y. In this manner, the apparatus can determine whether the detection signals S are outputted as a result of detecting the cosmic ray muon 1 by the plurality of detectors 11 or not.

The trigger signal G is generated after elapse of a certain period from the generation time point To at which the detector 11 actually detects the cosmic ray muon 1 and generates the detection signal S. Thus, in the Y-axis direction detector unit 20Y, when the trigger signal G exists after the generation time point To of each detection signal S is measured by the generation time measurement unit 24 of the time calculator 41, the coincidence counting unit 44 outputs, to the trajectory calculator 14, the information on the detection signals S which can be regarded as having occurred within the same time span obtained by the time calculators 41*d*, 41*e*, and 41*f*, and eliminates other information. As a result, the minimum required information is outputted to the trajectory calculator 14.

The processing flow will be described by referring to FIG. 10. In the step S1, in the Y-axis direction detector unit 20Y, in response to the output of the detection signal S from the detector 11 of the X-axis direction detector unit 20X, the time calculator 41 acquires the information on the detection signal S for each detector 11 (i.e., generation time point To of the detection signal S, positional information of the detector 11 that has outputted the detection signal S), for example.

At this time, when the trigger signal receiver 43 of the Y-axis direction detector unit 20Y receives, for example, the trigger signal G from the trigger signal generator 42 of the time calculator 41 of the X-axis direction detector unit 20X in the step S2, the processing proceeds to the step S3.

In the step S3, the coincidence counting unit 44 of this Y-axis direction detector unit 20Y outputs, to the trajectory calculator 14, information on the detection signals S that can be regarded as having occurred within the same time span based on the trigger signal G, of the information related to the detection signal S acquired in the step S1.

In the next step S4, the trajectory calculator 14 calculates the trajectory of the cosmic ray muon 1 on the basis of the information on the minimum necessary detection signal(s) S outputted from the coincidence counting unit 44 of the Y-axis direction detector unit 20Y.

In the above-described case, the trigger signal generator 42 of the time calculator 41 generates the trigger signal G for the detection signal S from the signal processing circuit 12 belonging to the X-axis direction detector unit 20X, and this trigger signal G is received by the trigger signal receiver 43 of the time calculator 41 of the Y-axis direction detector unit 20Y.

For example, the apparatus 40 may be configured in such a manner that: (i) the trigger signal generator 42 of the time calculator 41*a* generates the trigger signal G for the detection signal S from the signal processing circuit 12 belonging to the X-axis direction detector unit 20X; (ii) this trigger signal G is also received by the respective trigger signal receivers 43 of the other time calculators 41*b* and 41*c* in the X-axis direction detector unit 20X; and (iii) the coincidence counting units 44 of these time calculators 41*b* and 41*c* output the information on the detection signal S to the trajectory calculator 14.

Since the charged-particle trajectory measurement apparatus 40 according to the second embodiment is configured as described above, the following effect (4) in addition to the effects (1) to (3) of the first embodiment are obtained.

(4) The coincidence counting unit 44 of the time calculator 41 outputs, to trajectory calculator 14, information on a plurality of detection signals S that can be regarded as having occurred within the same time span based on the trigger signal G from the trigger signal generator 42 (for example, within the same short period during which the trigger signal G is being outputted), i.e., both of the positional information on the detector(s) 11 having detected the cosmic ray muon 1 and information on the generation time point To of the detection signals S, and eliminates the information on any event having occurred outside the same time span. The trajectory calculator 14 calculates the trajectory of the cosmic ray muon 1 only on the basis of the above-described information on the detection signals S outputted from coincidence counting unit 44. As a result, the trajectory calculator 14 can remove unnecessary noise, and thus, the trajectory of the cosmic ray muon 1 can be calculated with further higher accuracy.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A charged-particle trajectory measurement apparatus configured to measure a trajectory of a charged particle, the charged-particle trajectory measurement apparatus comprising:
   a plurality of detectors, each of which generates a detection signal when detecting a charged particle;
   a signal processing circuit that processes the detection signal from a detector;
   a time calculator that calculates a generation time point of the detection signal from the detector based on a signal outputted from the signal processing circuit; and
   a trajectory calculator that calculates a trajectory of the charged particle based on positional information of the detector having detected the charged particle,
   wherein:
   the detectors and the signal processing circuit are integrally configured by being coupled to each other:
   each of the plurality of detectors is configured as a tubular body in such a manner that a core wire provided in the tubular body is held by a connector;
   the signal processing circuit is configured as a circuit component formed on a substrate that is housed in a casing; and
   the signal processing circuit and each of the plurality of detectors are integrally configured by being coupled to each other in such a manner that a pin protruding from the substrate is interdigitated with and coupled to the connector and the casing is connected to a ground of the tubular body.

2. The charged-particle trajectory measurement apparatus according to claim 1, wherein:
   the plurality of detectors comprises sixteen or more detectors;
   at least eight of the plurality of detectors constitute an X-axis direction detector unit configured to detect a position of the charged particle in an X-axis direction, while a rest of the plurality of detectors constitute a Y-axis direction detector unit configured to detect a position of the charged particle in a Y-axis direction being orthogonal to the X-axis direction;
   the X-axis direction detector unit is composed of at least four layers in each of which at least two detectors are arranged in the X-axis direction; and
   the Y-axis direction detector unit is composed of at least four layers in each of which at least two detectors are arranged in the Y-axis direction.

3. A charged-particle trajectory measurement apparatus according to claim 1, configured to measure a trajectory of a charged particle, the charged-particle trajectory measurement apparatus comprising:
   a plurality of detectors, each of which generates a detection signal when detecting a charged particle;
   a signal processing circuit that processes the detection signal from a detector;
   a time calculator that calculates a generation time point of the detection signal from the detector based on a signal outputted from the signal processing circuit; and
   a trajectory calculator that calculates a trajectory of the charged particle based on positional information of the detector having detected the charged particle,
   wherein the detectors and the signal processing circuit are integrally configured by being coupled to each other,
   wherein the signal processing circuit includes:
     a signal amplifier configured to amplify the detection signal from the detector; and
     an A/D convertor configured to convert a signal outputted from the signal amplifier into a digital signal, and
   wherein the time calculator includes:
     a generation time measurement unit configured to measure a generation time point of the detection signal from the detector based on the digital signal obtained by the A/D convertor in the signal processing circuit; and
     a disappearance time measurement unit configured to measure a disappearance time point of the detection signal.

4. The charged-particle trajectory measurement apparatus according to claim 3, wherein the time calculator includes:
   a trigger signal generator configured to generate a trigger signal that notifies generation of the detection signal from the detector based on output of the digital signal from the signal processing circuit;
   a trigger signal receiver configured to receive the trigger signal from an outside; and
   a coincidence counting unit configured to output, to the trajectory calculator, information on a plurality of detection signals that can be regarded as having occurred within a same time span based on the trigger signal.

5. A charged-particle trajectory measurement apparatus configured to measure a trajectory of a charged particle, the charged-particle trajectory measurement apparatus comprising:
   a plurality of detectors, each of which generates a detection signal when detecting a charged particle;
   a signal processing circuit that processes the detection signal from a detector;
   a time calculator that calculates a generation time point of the detection signal from the detector based on a signal outputted from the signal processing circuit;
   a trajectory calculator that calculates a trajectory of the charged particle based on positional information of the detector having detected the charged particle;
   a frame that supports the plurality of detectors, the signal processing circuit, and the time calculator; and
   a cover that covers periphery of the frame,
   wherein the detectors and the signal processing circuit are integrally configured by being coupled to each other.

6. The charged-particle trajectory measurement apparatus according to claim 5, wherein the cover is provided with a heat radiator configured to radiate heat generated inside the cover.

* * * * *